US005410302A

United States Patent [19]

Dulaney, III et al.

[11] Patent Number: 5,410,302

[45] Date of Patent: Apr. 25, 1995

[54] METHOD AND APPARATUS FOR PROCESSING A RECEIVED MESSAGE IN A COMMUNICATION RECEIVER

[75] Inventors: Harry G. Dulaney, III, Boca Raton; Mark T. Stair, Delray Beach, both of Fla.

[73] Assignee: Motorola, Inc., Schaumburg, Ill.

[21] Appl. No.: 11,920

[22] Filed: Feb. 1, 1993

[51] Int. Cl.6 .......................... G08B 5/22; H04Q 7/00

[52] U.S. Cl. .......................... 340/825.44; 340/825.27

[58] Field of Search ...................... 340/825.44, 825.47, 340/825.48, 825.26, 825.27, 311.1, 825.15; 455/38.1, 38.4, 228; 379/56, 57; 371/69.1

[56] References Cited

U.S. PATENT DOCUMENTS

| | | | |
|---|---|---|---|
| 4,477,807 | 10/1984 | Nakajima et al. | 340/825.44 |
| 4,704,608 | 11/1987 | Sato et al. | 340/825.44 |
| 4,759,022 | 7/1988 | Akerberg | 371/69.1 |
| 4,764,928 | 8/1988 | Akerberg | 371/69.1 |
| 4,786,901 | 11/1988 | Matai et al. | 340/825.47 |
| 4,835,777 | 5/1989 | DeLuca et al. | 371/69.1 |
| 4,873,519 | 10/1989 | Matai et al. | 340/825.44 |
| 4,956,641 | 9/1990 | Matai et al. | 340/825.47 |
| 5,173,688 | 12/1992 | DeLuca et al. | 340/825.44 |

OTHER PUBLICATIONS

Motorola, Inc. "Catalog Sheet R3-5-126D 'BRAVO TM Numeric Display Pager", Beep-on-Bad-Data (POCSAG) paragraph on Options/ADVANTAGES page, 1990, U.S.A.

*Primary Examiner*—Donald J. Yusko
*Assistant Examiner*—Edwin C. Holloway, III
*Attorney, Agent, or Firm*—R. Louis Breeden

[57] ABSTRACT

A method and apparatus process (300) a message received by a communication receiver (100) having a memory (110) for storing (324) a periodically received mail-drop message including an address and information having an effective length. When a new mail-drop message is received (302), a processor (108) determines (400) whether to replace (408) an old mail-drop message received (302) and stored (324) earlier in the memory (110), in response to the information of the new mail-drop message.

15 Claims, 5 Drawing Sheets

400

METHOD AND APPARATUS FOR PROCESSING A RECEIVED MESSAGE IN A COMMUNICATION RECEIVER

FIELD OF THE INVENTION

This invention relates in general to communication receivers, and more specifically to a method and apparatus for processing a received message in a communication receiver.

BACKGROUND OF THE INVENTION

Portable radio communication receivers for receiving numeric and alphanumeric messages, e.g., selective call receivers, are well known. Such receivers have long been used for receiving "individual" messages, i.e., messages selectively transmitted to one or more specific, uniquely addressable receivers. A newer application for such receivers that has continued to grow in popularity has been the "mail-drop" application. In such an application a single mail-drop message that was of general interest to a plurality of users of the receivers was updated and retransmitted periodically to a mail-drop address held in common by the plurality of the receivers. Mail-drop messages typically have comprised information such as current stock quotes, sports scores, money exchange rates, etc.

Unfortunately, portable radio communication receivers have been and continue to be moved to locations where radio reception is poor enough to cause errors in a received message, such as injected data bits due to burst noise, and omitted bits due to signal fading. Such errors and omissions can be particularly problematic in mail-drop messages, which may contain information used in making important decisions, e.g., financial decisions.

Thus, what is needed is a method and apparatus for reducing deleterious effects on the information contained in a mail-drop message, wherein the deleterious effects are caused by reception errors when the receiver is carried temporarily to an area of poor radio reception.

SUMMARY OF THE INVENTION

An aspect of the present invention is a method of processing a message received by a communication receiver comprising a memory for storing a periodically received mail-drop message and an effective length calculated therefor. The mail-drop message includes an address and information having an effective length that is substantially constant from one transmission to the next when the mail-drop message is received without any uncorrectable errors. The method comprises the steps of receiving a new mail-drop message, and counting uncorrectable errors in the information of the new mail-drop message as received. The method further comprises the steps of thereafter calculating a new effective length for the new mail-drop message received, and storing the new mail-drop message and the new effective length calculated therefor in the memory in place of an old mail-drop message and an old effective length calculated therefor, in response to having counted in the counting step a number of uncorrectable errors less than or equal to a predetermined number. The method also includes the step of retaining in the memory the old mail-drop message and the old effective length calculated therefor, in response to having counted in the counting step more than the predetermined number of uncorrectable errors in the information of the new mail-drop message when the new effective length is less than a predetermined fraction of the old effective length. In addition, the method includes the step of storing the new mail-drop message and the new effective length calculated therefor in the memory in place of the old mail-drop message and the old effective length calculated therefor, in response to having counted in the counting step more than the predetermined number of errors in the information of the new mail-drop message when the new effective length is greater than or equal to a predetermined fraction of the old effective length.

Another aspect of the present invention is a communication receiver for receiving a message including an address and information having an effective length. The communication receiver comprises a receiver for periodically receiving a new mail-drop message having an effective length that is substantially constant from one transmission to the next when the mail-drop message is received without any uncorrectable errors, and a memory coupled to the receiver for storing the new mail-drop message. The communication receiver further comprises a processor coupled to the receiver and coupled to the memory for controlling the communication receiver and for calculating a new effective length for the new mail-drop message received, and an error/length-compare processor element for counting uncorrectable errors in the information of the new mail-drop message as received. The error/length-compare processor element is also for storing the new mail-drop message and the new effective length calculated therefor in the memory in place of an old mail-drop message and an old effective length calculated therefor, in response to having counted a number of uncorrectable errors less than or equal to a predetermined number, and is further for retaining in the memory the old mail-drop message and the old effective length calculated therefor, in response to having counted more than the predetermined number of uncorrectable errors in the information of the new mail-drop message when the new effective length is less than a predetermined fraction of the old effective length. The communication receiver also includes a negligible-errors processor element coupled to the error/length-compare processor element for storing the new mail-drop message and the new effective length calculated therefor in the memory in place of the old mail-drop message and the old effective length calculated therefor, in response to having counted more than the predetermined number of errors in the information of the new mail-drop message when the new effective length is greater than or equal to a predetermined fraction of the old effective length.

Another aspect of the present invention is a communication system, comprising a transmitter for periodically transmitting a new mail-drop message comprising an address and information having a substantially invariant length, and a controller coupled to the transmitter for formatting the mail-drop message and controlling the periodic transmissions thereof. The communication system further comprises a communication receiver coupled to the transmitter for receiving the new mail-drop message. The information of the mail-drop message as received has an effective length that is substantially constant from one transmission to the next when the mail-drop message is received without any uncorrectable errors. The communication receiver comprises a receiver for receiving the new mail-drop message, and a memory coupled to the receiver for storing the new mail-drop message. The communication receiver further comprises a processor coupled to the receiver and coupled to the memory for controlling the communication receiver and for calculating a new effective length for the new mail-drop message received, and an error/length-compare processor element for counting uncorrectable errors in the information of the new mail-drop message as received. The error/length-compare processor element is also for storing the new mail-drop message and the new effective length calculated therefor in the memory in place of an old mail-drop message and an old effective length calculated therefor, in response to having counted a number of uncorrectable errors less than or equal to a predetermined number, and is further for retaining in the memory the old mail-drop message and the old effective length calculated therefor, in response to having counted more than the predetermined number of uncorrectable errors in the information of the new mail-drop message when the new effective length is less than a predetermined fraction of the old effective length. The communication receiver also includes a negligible-errors processor element coupled to the error/length-compare processor element for storing the new mail-drop message and the new effective length calculated therefor in the memory in place of the old mail-drop message and the old effective length calculated therefor, in response to having counted more than the predetermined number of errors in the information of the new mail-drop message when the new effective length is greater than or equal to a predetermined fraction of the old effective length.

DESCRIPTION OF THE PREFERRED EMBODIMENT

Figure 1:
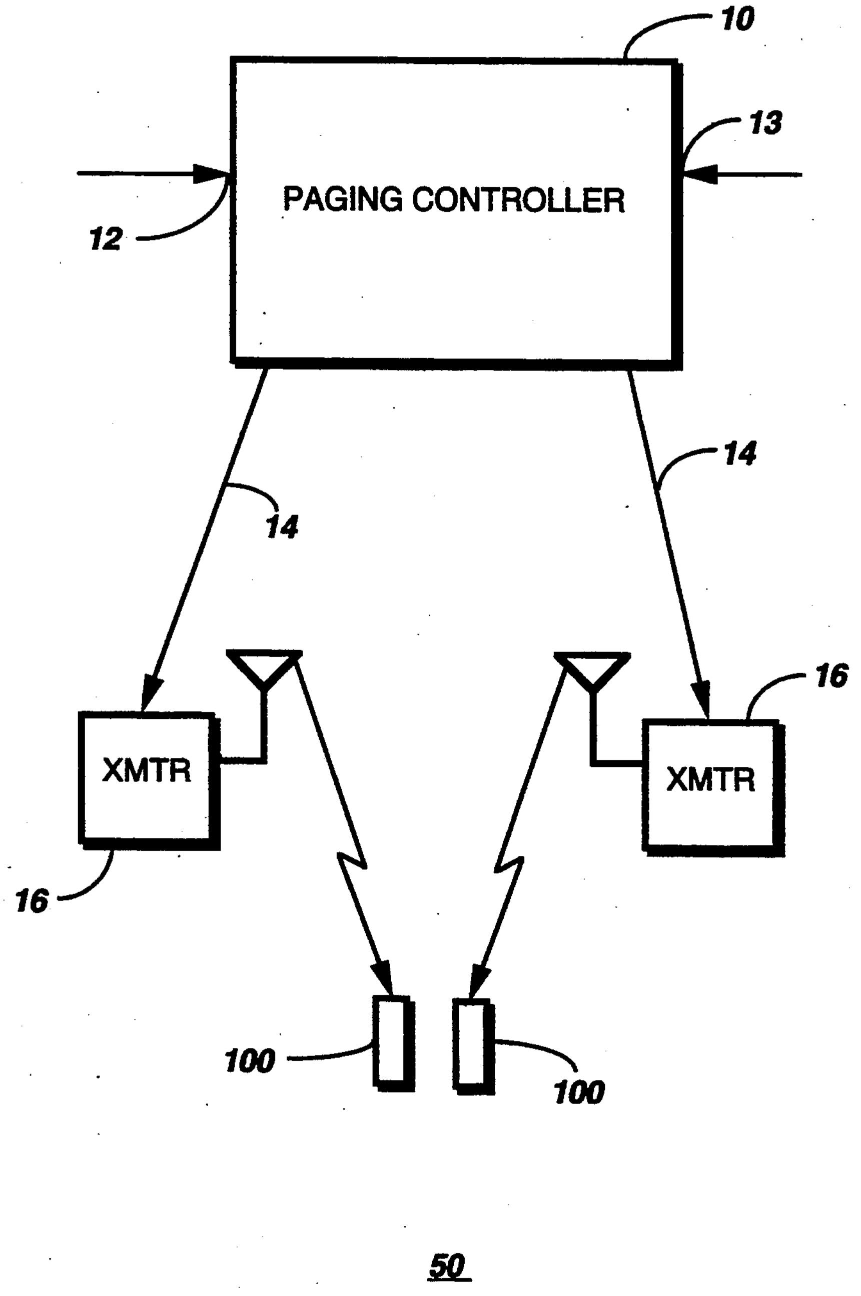
FIG. 1 is a system block diagram of a communication system in accordance with the preferred embodiment of the present invention.

Referring to FIG. 1, a system block diagram of a communication system 50 in accordance with the preferred embodiment of the present invention comprises a paging controller 10 for formatting selective call messages and controlling the transmission thereof. The paging controller 10 comprises a telephone input 12 for receiving calls directed to individual selective call receiver addresses in a manner well known in the art. The paging controller 10 further comprises a data services input 13 for receiving information, e.g., stock quotes, sports scores, etc., from a data services system in a manner also well known in the art. The paging controller 10 is coupled by at least one line 14 to at least one paging transmitter 16 for transmitting the selective call messages by radio communications to at least one selective call receiver 100. Preferably, the paging controller 10 is a model E09PED0552 PageBridge® paging terminal, the paging transmitter is a model C73 PURC 5000® transmitter, and the selective call receiver is a model A03KLB5962CA ADVISOR® pager, all manufactured by Motorola, Inc. of Schaumburg, Ill. It will be appreciated that other similar equipment may be used as well to construct the communication system 50. During operation, the paging controller 10 periodically, e.g., every 15 minutes, assembles the latest information received by the data services input 13 and formats a "mail-drop" message, which the paging controller 10 then sends to the paging transmitter 16 for radio transmission to the selective call receiver 100. Typically, the mail-drop message is formatted to have substantially the same length from one transmission to the next. This is done because the mail-drop message typically reports a substantially constant number of data service variables. It is only the values of the data service variables that change (usually by relatively small increments) from one transmission to the next.

Figure 2:
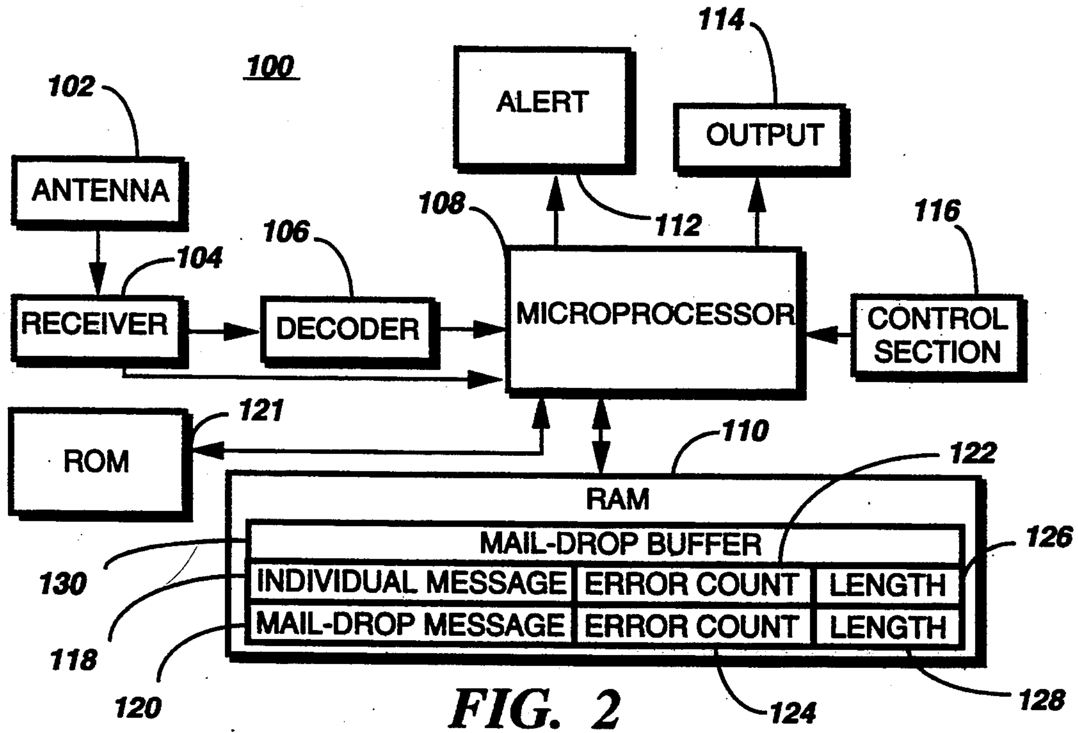
FIG. 2 is an electrical block diagram of a communication receiver in accordance with the preferred embodiment of the present invention.

Referring to FIG. 2, an electrical block diagram of a communication receiver 100 in accordance with the preferred embodiment of the present invention comprises an antenna 102 for intercepting RF signals. The antenna 102 is coupled to a receiver 104 for receiving and demodulating the RF signals intercepted. A decoder 106 is coupled to the receiver 104 for decoding a demodulated address transmitted in any of a number of well-known signaling protocols, such as POCSAG or GSC selective call signaling. A microprocessor 108, e.g., the MC68HC05C8 or C11 series microcomputers manufactured by Motorola, Inc. of Schaumburg, Ill., is also coupled to the receiver 104 for processing the demodulated information. The microprocessor 108 is responsive to the decoder 106 and is coupled to a random access memory (RAM) 110 for storing recovered information having an address assigned to the communication receiver 100. The RAM 110 comprises a mail-drop buffer 130 for temporarily storing a new mail-drop message. The RAM 110 further comprises a predefined individual message location 118 for storing individual messages, and a mail-drop location 120 for longer term storage of mail-drop messages. The RAM 110 further comprises corresponding error count locations 122, 124 and message length locations 26, 128 for storing an error count and a message length corresponding to a message stored in the individual message location 118 and the mail-drop location 120, respectively. An alert generator 112 is coupled to the microprocessor 108 for providing an audible or tactile alert to a user when the microprocessor 108 has a message ready for presentation.

An output device 114 comprises a visual display or an audio transducer or both, the output device 114 also being controlled by the microprocessor 108. A control section 116 comprises user accessible controls for allowing the user to command the microprocessor 108 to perform the selective call receiver operations well known to one of ordinary skill in the art, and typically includes control switches such as an on/off control button, a function control, etc.

The microprocessor 108 is coupled to a read-only memory (ROM) 121 comprising special processor elements, i.e., firmware elements, in accordance with the preferred embodiment of the present invention. The firmware elements are described herein below in the discussion of FIG. 3. It will be appreciated that the functions of the decoder 106, the RAM 110, and the ROM 121 may be incorporated into the microprocessor 108 as well, as contiguous components thereof. It will be further appreciated that other types of non-volatile memory, e.g., programmable read-only memory (PROM) and electrically-erasable programmable read-only memory (EEPROM), may be used as well for the ROM 121.

Figure 3:
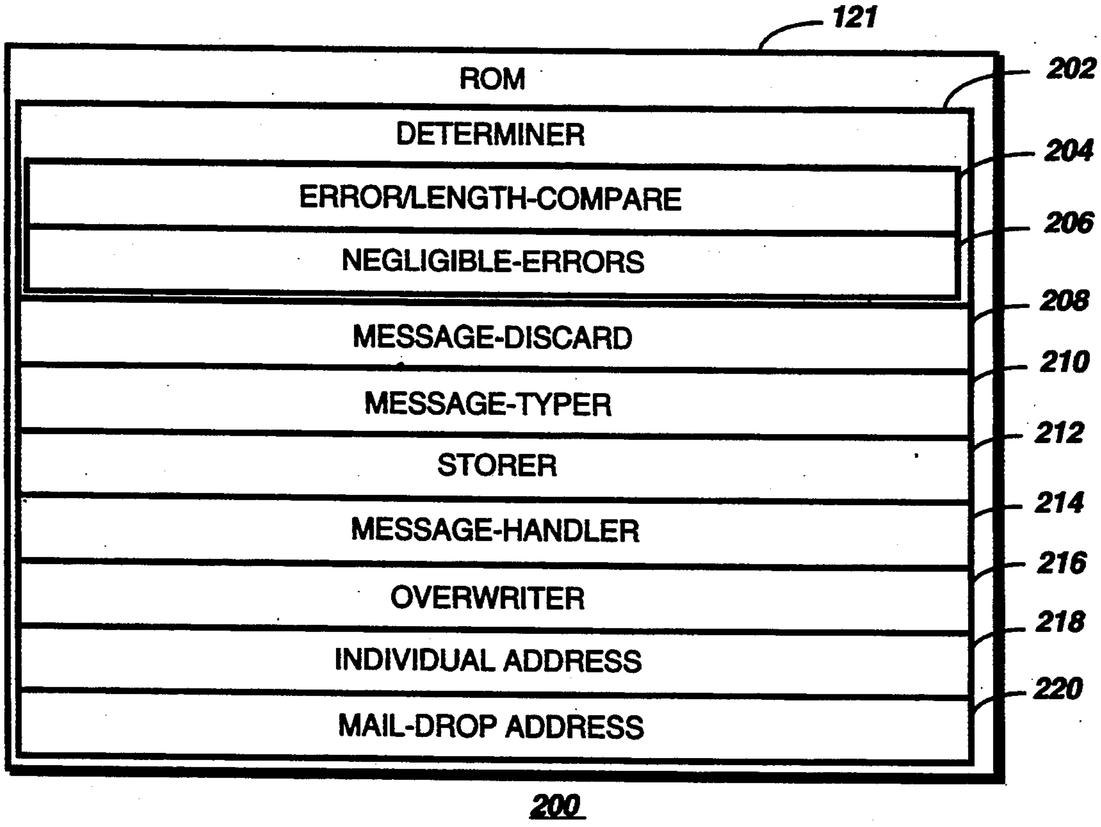
FIG. 3 is a firmware block diagram of firmware elements in a read-only memory (ROM) of the communication receiver in accordance with the preferred embodiment of the present invention.

Referring to FIG. 3, a firmware block diagram 200 of firmware elements in the ROM 121 of the communication receiver 100 in accordance with the preferred embodiment of the present invention depicts a Determiner element 202 for determining whether to replace or retain an old mail-drop message received and stored earlier in the mail-drop location 120, in response to the error count and "effective" length of the information of the new mail-drop message. In accordance with the preferred embodiment of the present invention, the "effective" length of the information is defined to be the total length of all portions of information received, less any portion(s) determined to contain non-correctable errors. It will be appreciated that, in accordance with alternative embodiments of the present invention, other definitions of effective length can be used as well, e.g., the total number of characters received less any errored characters received, or simply the total length of the information received without regard to errors.

The Determiner element 202 comprises an Error/Length-Compare element 204 for deciding between replacing and retaining the old mail-drop message based upon both a number of errors in the new mail-drop message and a comparison of the effective lengths of the new and old mail-drop messages. The Determiner element 202 further comprises a Negligible-Errors element 206 for counting errors in the new mail-drop message and deciding to replace the old mail-drop message in response to finding a negligible number of errors in the new mail-drop message.

The firmware block diagram 200 further depicts a Message-Discard element 208 for discarding the new mail-drop message in response to the Determiner element 202 having determined to retain the old mail-drop message, and a Message-Typer element 210 for selecting between individual and mail-drop definitions of a received message, based upon the address received in the received message and decoded by the decoder 106. The firmware block diagram 200 further depicts a Storer element 212 for selecting between the individual message location 118 and the mail-drop location 120 for storing a received message, based upon the definition assigned by the Message-Typer element 210. The firmware block diagram 200 further depicts a Message-Handler element 214 for processing a received message in one of two different predetermined manners, based upon the definition assigned by the Message-Typer element 210. For example, the Message-Handler can allow a received message defined to be an individual message to generate an alert from the alert generator 112, while a received message defined to be a mail-drop message does not generate any alert.

The firmware block diagram 200 further depicts an Overwriter element 216 for replacing the old mail-drop message with the new mail-drop message in response to the Determiner element 202 having determined to replace the old mail-drop message. In addition, the firmware block diagram 200 depicts an Individual Address element 218 and a Mail-Drop Address element 220 for storing an individual selective call address and a mail-drop selective call address for the communication receiver 100. It will be appreciated that the individual selective call address and the mail-drop selective call address may be stored as well in a storage element different from the ROM 121, e.g., in a separate "code plug" element as is well-known in the art.

Figure 4:
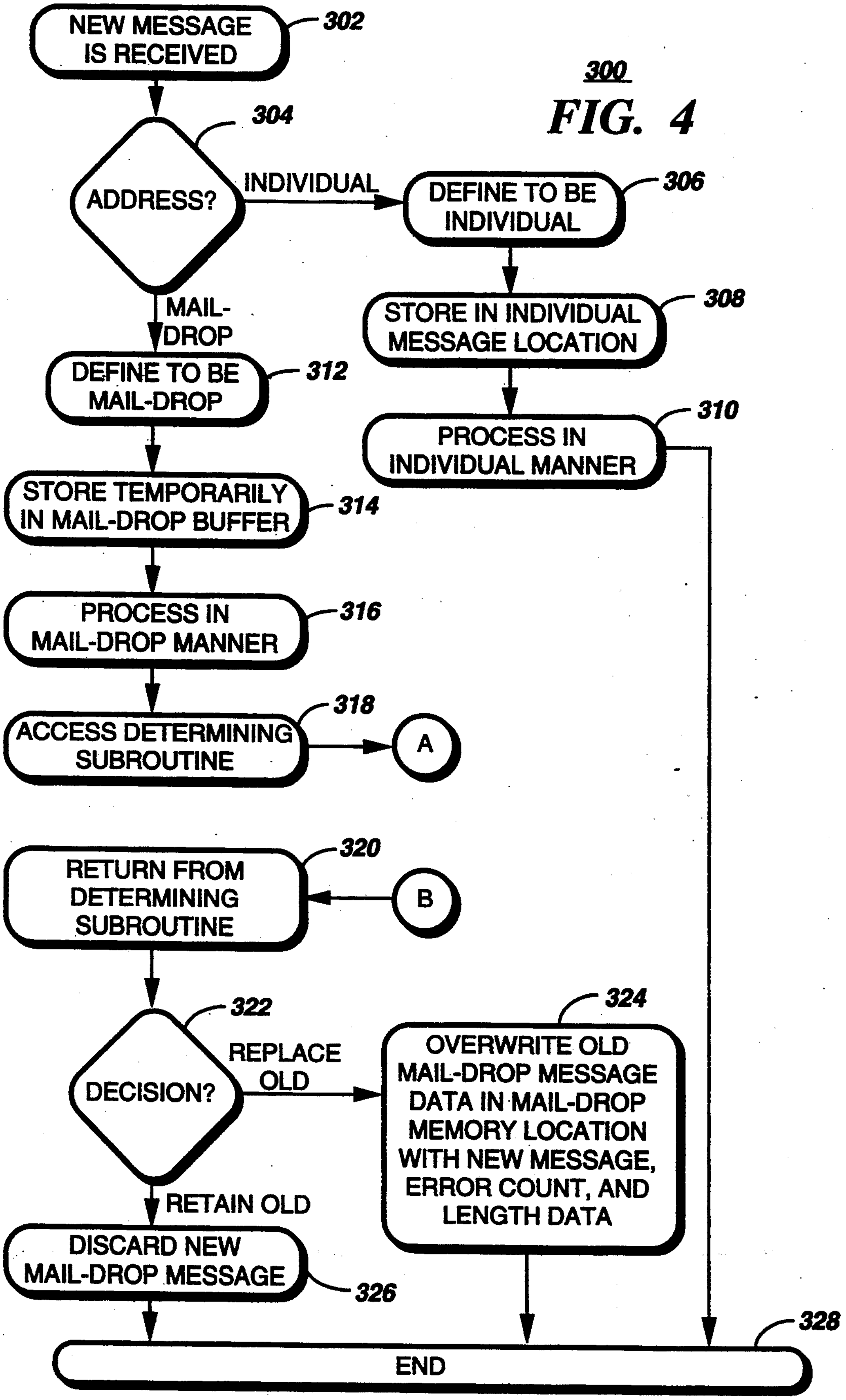
FIG. 4 is a main flow chart of the operation of the communication receiver in accordance with the preferred embodiment of the present invention.

Referring to FIG. 4, a main flow chart 300 of the operation of the communication receiver 100 in accordance with the preferred embodiment of the present invention begins with a new message being received 302 by the receiver 104. In response, the decoder 106 decodes the address portion of the new message and informs the microprocessor 108. If in step 304 the address matches an individual address of the communication receiver 100, then the microprocessor 108, under control of the Message-Typer element 210, defines 306 the received message to be an individual message. Next, under control of the Storer element 212 the microprocessor 108 stores the received message and an error count for the message, and calculates and stores an effective length of the information. The message, the error count, and the effective length are stored in the individual message location 118, the error count location 122, and the message length location 126, respectively, of the RAM 110. Then the microprocessor 108 processes 310 the received message in a manner predetermined for an individual message, e.g., generating an audible alert, under the control of the Message-Handler element 214, and the flow ends 328.

It is important to note here that the "effective" length is preferably defined to be the total length of all portions of the information received, less any portion(s) determined to contain non-correctable errors. For example, a transmitted two-hundred-character message that is received with ten non-correctable errored characters and is truncated by reception loss after the one-hundredth character has an effective length of ninety characters.

If, on the other hand, at step 304 the address matches a mail-drop address of the communication receiver 100, then the microprocessor 108, under control of the Message-Typer element 210, defines 312 the received message to be a mail-drop message, and stores 314 the new mail-drop message temporarily in the mail-drop buffer 130 of the RAM 110. Then the microprocessor 108 processes 316 the received message in a manner predetermined for a mail-drop message, e.g., no alert, under control of the Message-Handler element 214. Next, the microprocessor 108 accesses 318 the determining subroutine available in the Determiner element 202 to decide whether or not to replace an old mail-drop message stored earlier in the RAM 110. Operation of the determining subroutine is described herein below in the description of FIG. 5.

When the flow returns 320 from the determining subroutine, the microprocessor 108 checks 322 the decision reached by the determining subroutine. If the decision is to retain the old mail-drop message, then the microprocessor 108, under control of the Message-Discard element 208, discards 326 the new mail-drop message, and the flow ends 328. If, on the other hand, the decision is to replace the old mail-drop message, then the microprocessor 108, under control of the Overwriter element 216 overwrites 324 the old mail-drop data in the mail-drop location 120, the error count location 124, and the message length location 128 of the RAM 110 with the new message, a new error count, and a new calculated effective length of the information of the new message, respectively, and then the flow ends 328.

Figure 5:
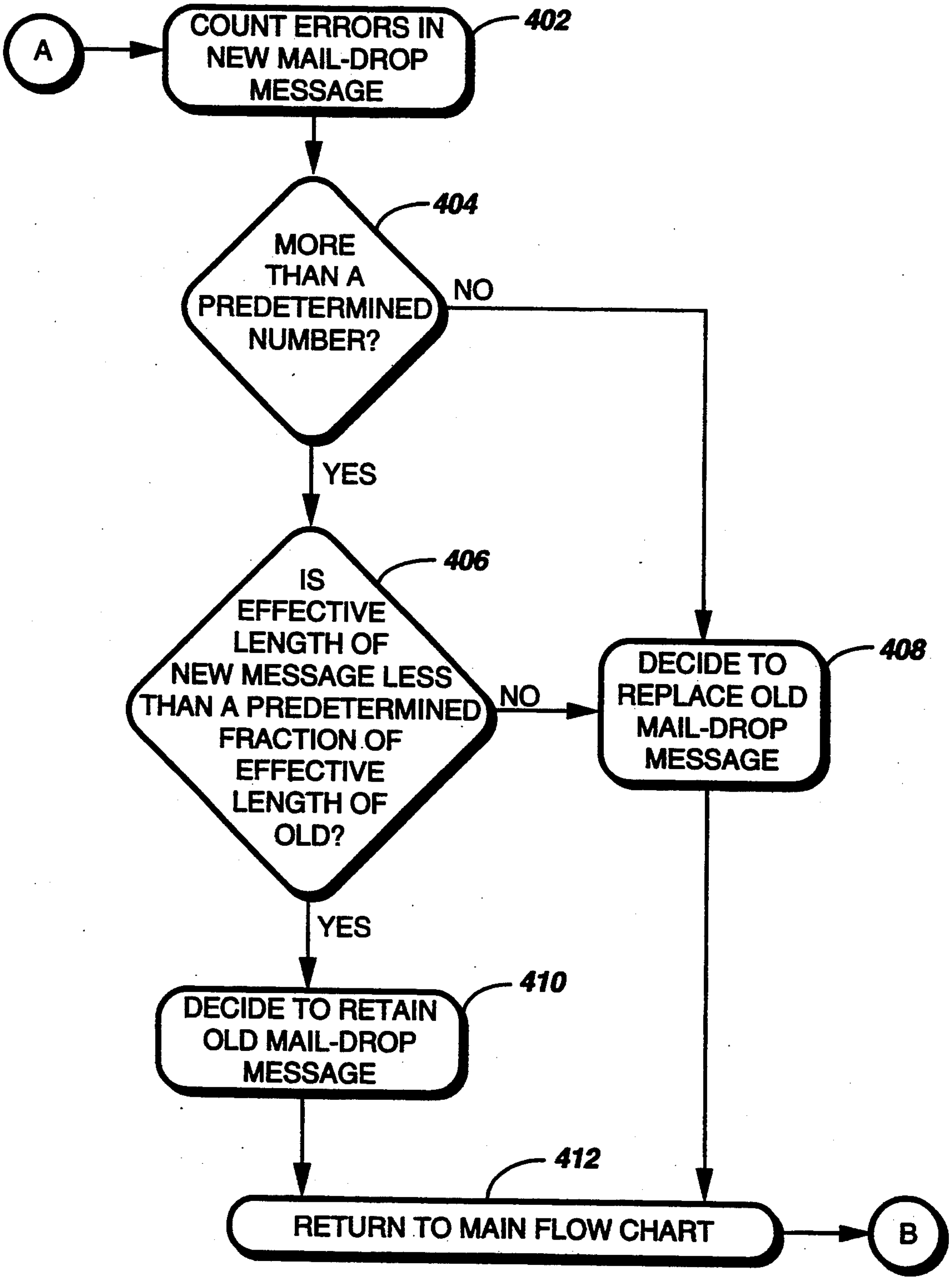
FIG. 5 is a flow chart of a determining subroutine in the communication receiver in accordance with the preferred embodiment of the present invention.

Referring to FIG. 5, a flow chart 400 of the determining subroutine in the communication receiver 100 in accordance with the preferred embodiment of the present invention begins with the microprocessor 108 counting errors 402 in the new mail-drop message, under control of the Error/Length-Compare element 204. Then in step 404 the microprocessor 108 determines whether there are more than a predetermined number of errors, e.g., more than one error, in the new mail-drop message. If not, the microprocessor 108 decides 408 to replace the old mail-drop message, and the flow returns 412 to the main flow chart 300 (FIG. 4) at step 320.

If, on the other hand, there are more than the predetermined number of errors, then from step 404 flow moves to step 406, where the microprocessor 108 determines whether the effective length, i.e., the total length of the non-errored received portions, of the information of the new mail-drop message is less than a predetermined fraction, e.g., 95 percent, of the effective length of the old mail-drop message.

If the effective length of the new mail-drop message is not less than a predetermined fraction of the effective length of the old mail-drop message, the microprocessor 108 decides 408 to replace the old mail-drop message, and the flow returns 412 to the main flow chart 300 (FIG. 4) at step 320. If, instead, the microprocessor 108 determines in step 406 that the effective length of the new mail-drop message is less than the predetermined fraction of the effective length of the old mail-drop message, then the microprocessor 108 decides 410 to retain the old mail-drop message, and the flow returns 412 to the main flow chart 300 (FIG. 4) at step 320.

By examining the new mail-drop message information for errors and then comparing the effective length of the new message with the effective length of the old message before overwriting the old message, the preferred embodiment of the present invention advantageously prevents a new message that is errored and/or truncated beyond predetermined limits from overwriting an old message received and stored earlier.

A mail-drop message typically is retransmitted periodically, e.g., every fifteen minutes; and the values contained in the information of a typical mail-drop message, e.g., stock quotes, normally can be expected to change by substantially insignificant amounts from one transmission to the next. Thus, the preferred embodiment of the present invention retains the slightly dated, but less erroneous and less truncated information of the old mail-drop message instead of overwriting the old message with the more current, but more errored and truncated information of the new mail-drop message. This aspect of the present invention is particularly advantageous in applications such as financial data services, in which having slightly dated information is generally better than having either no information or erroneous information.

Figure 6:
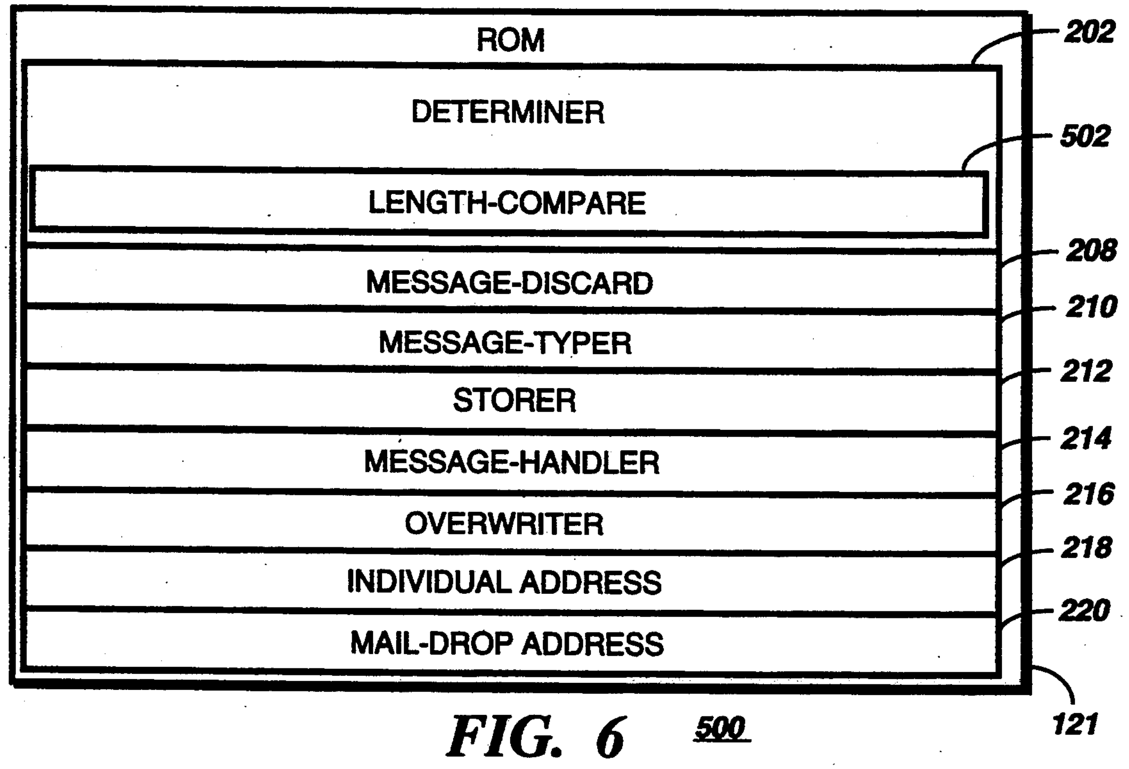
FIG. 6 is a firmware block diagram of firmware elements in the ROM of the communication receiver in accordance with a first alternative embodiment of the present invention.

Referring to FIG. 6, a firmware block diagram 500 of firmware elements in the ROM 121 of the communication receiver 100 in accordance with a first alternative embodiment of the present invention is depicted. The essential difference between the firmware block diagram 500 and the firmware block diagram 200 is the substitution of the Error/Length-Compare element 204 and the Negligible-Errors element 206 of the firmware block diagram 200 by a Length-Compare element 502 in the firmware block diagram 500. The substitution changes the operation of the determining subroutine under control of the Determiner element 202 as described herein below.

Figure 7:
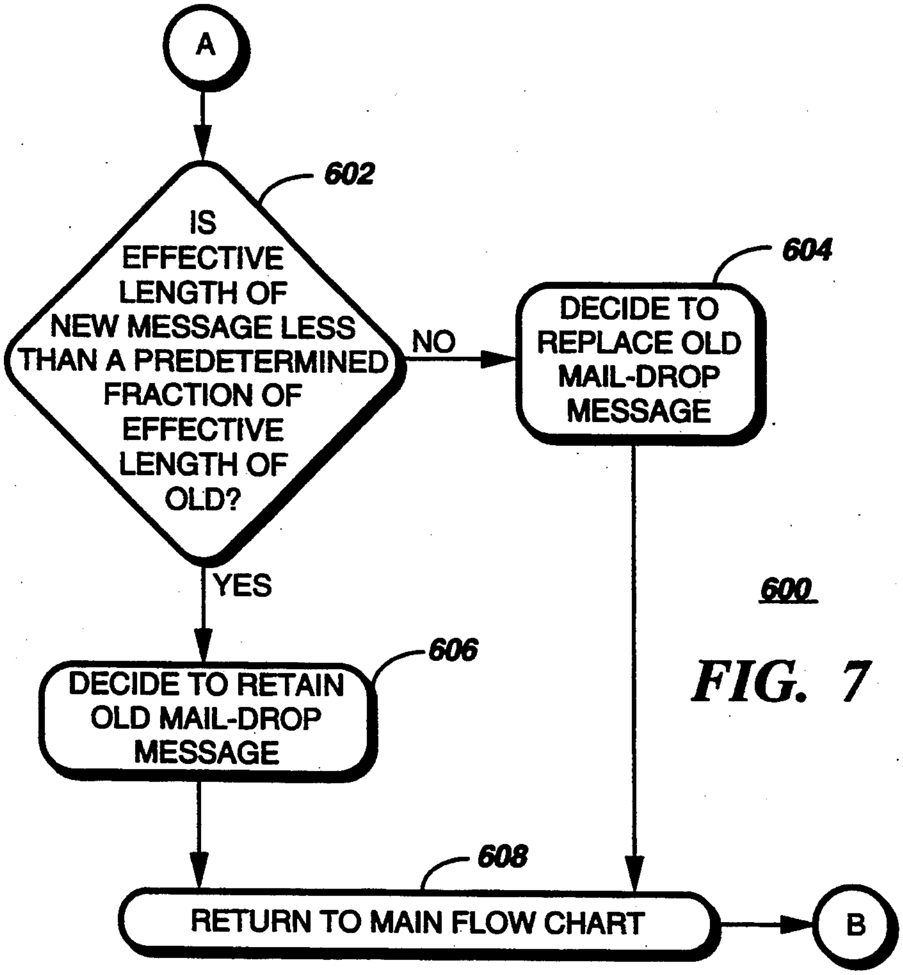
FIG. 7 is a flow chart of the determining subroutine in the communication receiver in accordance with the first alternative embodiment of the present invention.

With reference to FIG. 7, a flow chart 600 of the determining subroutine in the communication receiver 100 in accordance with the first alternative embodiment of the present invention begins with step 602. At step 602 the microprocessor 108, under control of the Length-Compare element 502 checks to see whether the "effective" length of the information of the new mail-drop message is less than a predetermined fraction, e.g., 95 percent, of the effective length of the old mail-drop message.

For the first alternative embodiment the "effective" length is preferably defined to be the length of all portions of the information received, including portions received with errors. It will be appreciated that other definitions of the "effective" length can be used as well, e.g., the number of characters received without regard to errors contained therein, or the number of blocks of information received, including errored blocks.

If the effective length of the information of the new mail-drop message is not less than a predetermined fraction of the effective length of the old mail-drop message, the microprocessor 108 decides 604 to replace the old mail-drop message, and the flow returns 608 to the main flow chart 300 (FIG. 4) at step 320. If, on the other hand, at step 602 the microprocessor 108 determines that the effective length of the new mail-drop message is less than the predetermined fraction of the effective length of the old mail-drop message, then the microprocessor 108 decides 606 to retain the old mail-drop message, and the flow returns 608 to the main flow chart 300 (FIG. 4) at step 320. Operation in accordance with the first alternative embodiment of the present invention is advantageous in applications in which calculation and storage of the number of errors in a message is impossible or not desirable.

Thus, the present invention provides a method and apparatus for reducing deleterious effects on the information contained in a mail-drop message, wherein the deleterious effects are caused by reception errors when the receiver is carried temporarily to an area of poor radio reception. The present invention is particularly advantageous in periodically retransmitted, substantially constant-message-length mail-drop applications in which the information of the mail-drop message typically can be expected to change by substantially insignificant amounts from one transmission to the next.

What is claimed is:

1. A method of processing a message received by a communication receiver comprising a memory for storing a periodically received mail-drop message and an effective length calculated therefor, the mail-drop message including an address and information having an effective length that is substantially constant from one transmission to the next when the mail-drop message is received without any uncorrectable errors, the method comprising the steps of:

receiving a new mail-drop message;

counting uncorrectable errors in the information of the new mail-drop message as received;

thereafter calculating a new effective length for the new mail-drop message received;

storing the new mail-drop message and the new effective length calculated therefor in the memory in place of an old mail-drop message and an old effective length calculated therefor, in response to having counted in said counting step a number of uncorrectable errors less than or equal to a predetermined number;

retaining in the memory the old mail-drop message and the old effective length calculated therefor, in response to having counted in said counting step more than the predetermined number of uncorrectable errors in the information of the new mail-drop message when the new effective length is less than a predetermined fraction of the old effective length; and storing the new mail-drop message and the new effective length calculated therefor in the memory in place of the old mail-drop message and the old effective length calculated therefor, in response to having counted in said counting step more than the predetermined number of errors in the information of the new mail-drop message when the new effective length is greater than or equal to a predetermined fraction of the old effective length.

2. The method of claim 1, wherein the new mail-drop message as received includes both a non-errored portion that can comprise both error-free portions and portions with correctable errors, and an errored portion that comprises at least one non-correctable error, and wherein the calculating step comprises the step of computing the effective length as the total length of the non-errored portion.

3. The method of claim 1, wherein the new mail-drop message as received includes both a non-errored portion that can comprise both error-free portions and portions with correctable errors, and an errored portion that comprises at least one non-correctable error, and wherein the calculating step comprises the step of computing the effective length as the total length of both the errored portion and the non-errored portion.

4. The method of claim 1, further comprising the step of discarding the new mail-drop message in response to retaining the old mail-drop message in said retaining step.

5. The method of claim 1, wherein the communication receiver is assigned an individual selective call address and a mail-drop selective call address, and wherein the memory comprises an individual message memory location and a mail-drop memory location, and wherein the method further comprises the steps of:

defining the received message to be an individual message when the received message is addressed to the individual selective call address, and to be a mail-drop message when the received message is addressed to the mail-drop selective call address;

storing the received message in the individual message memory location in response to the received message being defined in said defining step to be an individual message, and storing the received message in the mail-drop memory location in response to the received message being defined in said defining step to be a mail-drop message; and processing in a first predetermined manner the received message defined in said defining step to be an individual message, and processing in a second predetermined manner the received message defined in said defining step to be a mail-drop message.

6. A communication receiver for receiving a message including an address and information having an effective length, the communication receiver comprising:

a receiver for periodically receiving a new mail-drop message having an effective length that is substantially constant from one transmission to the next when the mail-drop message is received without any uncorrectable errors;

a memory coupled to said receiver for storing the new mail-drop message;

a processor coupled to said receiver and coupled to said memory for controlling the communication receiver and for calculating a new effective length for the new mail-drop message received;

an error/length-compare processor element for counting uncorrectable errors in the information of the new mail-drop message as received, and further for storing the new mail-drop message and the new effective length calculated therefor in the memory in place of an old mail-drop message and an old effective length calculated therefor, in response to having counted a number of uncorrectable errors less than or equal to a predetermined number, and further for retaining in the memory the old mail-drop message and the old effective length calculated therefor, in response to having counted more than the predetermined number of uncorrectable errors in the information of the new mail-drop message when the new effective length is less than a predetermined fraction of the old effective length; and a negligible-errors processor element coupled to the error/length-compare processor element for storing the new mail-drop message and the new effective length calculated therefor in the memory in place of the old mail-drop message and the old effective length calculated therefor, in response to having counted more than the predetermined number of errors in the information of the new mail-drop message when the new effective length is greater than or equal to a predetermined fraction of the old effective length.

7. The communication receiver of claim 6, further comprising a message-discard processor element coupled to said error/length-compare processor element for discarding the new mail-drop message in response to said error/length-compare processor element having retained the old mail-drop message.

8. The communication receiver of claim 6, wherein the communication receiver has an individual selective call address and a mail-drop selective call address, and wherein said memory comprises an individual message memory location and a mail-drop memory location, and wherein the communication receiver further comprises:

a message-typer processor element coupled to said processor for defining the received message to be an individual message when the received message is addressed to the individual selective call address, and for defining the received message to be a mail-drop message when the received message is addressed to the mail-drop selective call address;

a storer processor element coupled to said message-typer processor element for storing the received message in said individual message memory location in response to the received message being defined to be an individual message, and for storing the received message in said mail-drop memory location in response to the received message being defined to be a mail-drop message; and a message-handler processor element coupled to said message-typer processor element for processing in a first predetermined manner the received message defined to be an individual message, and for processing in a second predetermined manner the received message defined to be a mail-drop message.

9. The communication receiver of claim 6, wherein the new mail-drop message as received includes both a non-errored portion that can comprise both error-free portions and portions with correctable errors, and an errored portion that comprises at least one non-correctable error, and wherein the processor calculates the effective length as the total length of the non-errored portion.

10. The communication receiver of claim 6, wherein the new mail-drop message as received includes both a non-errored portion that can comprise both error-free portions and portions with correctable errors, and an errored portion that comprises at least one non-correctable error, and wherein the processor calculates the effective length as the total length of both the errored portion and the non-errored portion.

11. A communication system, comprising:

a transmitter for periodically transmitting a new mail-drop message comprising an address and information having a substantially invariant length;

a controller coupled to said transmitter for formatting the mail-drop message and controlling the periodic transmissions thereof; and a communication receiver coupled to said transmitter for receiving the new mail-drop message, wherein the information of the mail-drop message as received has an effective length that is substantially constant from one transmission to the next when the mail-drop message is received without any uncorrectable errors, said communication receiver comprising:

a receiver for receiving the new mail-drop message;

a memory coupled to said receiver for storing the new mail-drop message;

a processor coupled to said receiver and coupled to said memory for controlling said communication receiver and for calculating a new effective length for the new mail-drop message received;

an error/length-compare processor element for counting uncorrectable errors in the information of the new mail-drop message as received, and further for storing the new mail-drop message and the new effective length calculated therefor in the memory in place of an old mail-drop message and an old effective length calculated therefor, in response to having counted a number of uncorrectable errors less than or equal to a predetermined number, and further for retaining in the memory the old mail-drop message and the old effective length calculated therefor, in response to having counted more than the predetermined number of uncorrectable errors in the information of the new mail-drop message when the new effective length is less than a predetermined fraction of the old effective length; and a negligible-errors processor element coupled to the error/length-compare processor element for storing the new mail-drop message and the new effective length calculated therefor in the memory in place of the old mail-drop message and the old effective length calculated therefor, in response to having counted more than the predetermined number of errors in the information of the new mail-drop message when the new effective length is greater than or equal to a predetermined fraction of the old effective length.

12. The communication system of claim 11, wherein said communication receiver is assigned an individual selective call address and a mail-drop selective call address, and wherein said memory comprises an individual message memory location and a mail-drop memory location, and wherein said communication receiver further comprises:

a message-typer processor element coupled to said processor for defining the received message to be an individual message when the received message is addressed to the individual selective call address, and for defining the received message to be a mail-drop message when the received message is addressed to the mail-drop selective call address;

a storer processor element coupled to said message-typer processor element for storing the received message in said individual message memory location in response to the received message being defined to be an individual message, and for storing the received message in said mail-drop memory location in response to the received message being defined to be a mail-drop message; and a message-handler processor element coupled to said message-typer processor element for processing in a first predetermined manner the received message defined to be an individual message, and for processing in a second predetermined manner the received message defined to be a mail-drop message.

13. The communication system of claim 11 wherein said communication receiver further comprises a message-discard processor element coupled to said error/-length-compare processor element for discarding the new mail-drop message in response to said error/-length-compare processor element having retained the old mail-drop message.

14. The communication system of claim 11, wherein the new mail-drop message as received includes both a non-errored portion that can comprise both error-free portions and portions with correctable errors, and an errored portion that comprises at least one non-correctable error, and wherein the processor calculates the effective length as the total length of the non-errored portion.

15. The communication system of claim 11, wherein the new mail-drop message as received includes both a non-errored portion that can comprise both error-free portions and portions with correctable errors, and an errored portion that comprises at least one non-correctable error, and wherein the processor calculates the effective length as the total length of both the errored portion and the non-errored portion.

* * * * *